United States Patent
Scholz et al.

(10) Patent No.: US 11,394,277 B2
(45) Date of Patent: Jul. 19, 2022

(54) ELECTRIC DRIVE UNIT HAVING ELECTRICAL TERMINALS CONNECTED BY A CABLE

(71) Applicant: Dr. Ing. h.c. F. Porsche Aktiengesellschaft, Stuttgart (DE)

(72) Inventors: Jürgen Scholz, Leonberg (DE); Thomas Schmid, Markgröningen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/127,432

(22) Filed: Sep. 11, 2018

(65) Prior Publication Data

US 2019/0109518 A1    Apr. 11, 2019

(30) Foreign Application Priority Data

Oct. 11, 2017   (DE) .......................... 102017123589.2

(51) Int. Cl.
| | |
|---|---|
| H02K 11/33 | (2016.01) |
| H02K 11/30 | (2016.01) |
| B62D 5/04 | (2006.01) |
| H02K 5/22 | (2006.01) |

(52) U.S. Cl.
CPC ........... *H02K 11/33* (2016.01); *B62D 5/0406* (2013.01); *H02K 5/225* (2013.01); *H02K 11/30* (2016.01)

(58) Field of Classification Search
CPC .......... H02K 11/30; H02K 11/33; H02K 5/22; H02K 5/225; B62D 5/0406
USPC .................................................... 310/10, 71
See application file for complete search history.

(56) References Cited

U.S. PATENT DOCUMENTS

| | | | | |
|---|---|---|---|---|
| 5,008,494 A | * | 4/1991 | Wagener | ................ H01R 25/14 |
| | | | | 174/68.2 |
| 6,460,642 B1 | | 10/2002 | Hirano | |
| 7,059,918 B2 | * | 6/2006 | Matsumoto | ........ H01R 13/5812 |
| | | | | 439/752 |

(Continued)

FOREIGN PATENT DOCUMENTS

| | | |
|---|---|---|
| DE | 19953864 A1 | 5/2000 |
| DE | 102010014753 A1 | 10/2011 |
| DE | 102016100389 A1 | 7/2017 |

OTHER PUBLICATIONS

German Search Report for German Application No. 10 2017 123 589.2, dated Jun. 14, 2018, with partial English translation—7 pages.

(Continued)

*Primary Examiner* — Rashad H Johnson
(74) *Attorney, Agent, or Firm* — RatnerPrestia

(57) ABSTRACT

An electric drive unit having an electric motor and an electronic control unit, wherein the electric motor has at least a number of first electrical terminals and the electronic control unit has a number of second electrical terminals, wherein an electrical connection is formed between in each case a first electrical terminal and a second electrical terminal in such a way that a first busbar is connected to the first electrical terminal, or said terminal is embodied as such, and a second busbar is connected to the second electrical terminal, or said terminal is embodied as such, wherein the first busbar is electrically connected to the second busbar by means of a flexible electrically conductive element or a cable.

16 Claims, 1 Drawing Sheet

(56) References Cited

U.S. PATENT DOCUMENTS

| | | | | |
|---|---|---|---|---|
| 8,574,008 | B2* | 11/2013 | Große | H01M 50/571 |
| | | | | 439/627 |
| 10,477,717 | B2* | 11/2019 | Hasija | H05K 7/1472 |
| 10,847,941 | B2* | 11/2020 | Aneha | H02K 3/50 |
| 2010/0127586 | A1* | 5/2010 | Yoshida | H02K 5/22 |
| | | | | 310/71 |
| 2013/0105218 | A1* | 5/2013 | Kuboshima | B60R 16/0215 |
| | | | | 174/72 A |
| 2013/0134775 | A1* | 5/2013 | Tomokage | B60L 1/003 |
| | | | | 307/9.1 |
| 2013/0140055 | A1* | 6/2013 | Adachi | B60R 16/0215 |
| | | | | 174/113 R |
| 2013/0196533 | A1* | 8/2013 | Ogasawara | H01R 11/283 |
| | | | | 439/504 |
| 2015/0061422 | A1* | 3/2015 | Nagao | H02P 25/22 |
| | | | | 310/52 |
| 2016/0020657 | A1* | 1/2016 | Hattori | F04B 39/14 |
| | | | | 310/71 |
| 2018/0109040 | A1* | 4/2018 | Iizuka | H01F 17/062 |
| 2018/0269749 | A1* | 9/2018 | Gu | H02K 9/19 |
| 2018/0270994 | A1* | 9/2018 | Wang | H05K 7/20981 |

OTHER PUBLICATIONS

Chinese Office Action for Chinese Application No. 201811212310.4, dated Apr. 17, 2020, 6 pages.
Sharick, G., "Grounding and Bonding," May 31, 1988, 29 pages, Posts & Telecom Press.
Chinese Notification of Reexamination for Chinese Application No. 201811212310.4, dated Nov. 8, 2021, with translation, 13 pages.

* cited by examiner

ELECTRIC DRIVE UNIT HAVING ELECTRICAL TERMINALS CONNECTED BY A CABLE

CROSS-REFERENCE TO RELATED APPLICATION

This application claims priority to German Patent Application No. DE 10 2017 123 589.2, filed Oct. 11, 2017, which is incorporated by reference herein in its entirety.

FIELD OF THE INVENTION

The invention relates to an electric drive unit having an electric motor and an electronic control unit, such as in particular for a motor vehicle.

BACKGROUND OF THE INVENTION

Electric drive units for motor vehicles having an electromotive drive as the electric motor and having an electronic control unit are known in the prior art. In this context, the electronic control unit is embodied, for example, as a pulse width modulated inverter and is electrically connected to the electric motor. In this context, the poles of the pulse width modulated inverter are connected to the poles of the electric motor either directly with rigid busbars or connected by means of plugs and cables. Although the configuration with the busbars is a cost-effective solution, it has disadvantages in the case of thermal expansion effects and in the case of tolerance effects because the busbars, as solid metallic elements, yield mechanically only to a slight degree and therefore there is not sufficient adaptation to expansion effects or to the busbars in the case of unfavorable tolerance situations of the respective terminals, which can give rise to damage to the electric motor or to the pulse width modulated inverter. Although a configuration with plugs and cables has the advantage that the elasticity of the cables permits such effects to be compensated, there are cost disadvantages.

DE 199 53 864 A1, which is incorporated by reference herein, and DE 10 2010 014 753 A1, which is incorporated by reference herein, disclose an electrical connection by means of cables.

SUMMARY OF THE INVENTION

It is the object of the present invention to provide an electric drive unit which can be manufactured cost-effectively and meets the mechanical requirements.

One exemplary embodiment of the invention relates to an electric drive unit having an electric motor and an electronic control unit, wherein the electric motor has at least a number of first electrical terminals and the electronic control unit has a number of second electrical terminals, wherein an electrical connection is formed between in each case a first electrical terminal and a second electrical terminal in such a way that a first busbar is connected to the first electrical terminal, or said terminal is embodied as such, and a second busbar is connected to the second electrical terminal, or said terminal is embodied as such, wherein the first busbar is electrically connected to the second busbar by means of a flexible electrically conductive element or a cable. This ensures that both a favorable solution as well as a solution which permits defined mobility, for example in the case of thermal expansion, is achieved.

It is particularly advantageous if the electric motor and the electronic control, unit are embodied as one unit. As a result, simple mounting can be achieved, wherein in particular when there is a unit the flexible connection of the elements of the unit is advantageous.

In a further exemplary embodiment, it is expedient if the electronic control unit is a pulse width modulated inverter or has a pulse width modulated inverter. The pulse width modulated inverter serves here to convert the DC input voltage into a three-phase output voltage with variable amplitude, phase and frequency. The pulse width modulated inverter is therefore predominantly suitable for feeding three-phase electrical machines, such as an asynchronous machine, synchronous machine or the like. It is therefore advantageously possible for an alternating-current-powered or three-phase-current-powered electric machine to be operated as an electric motor with an input-side DC voltage.

It is also advantageous if the first busbars and the second busbars are of essentially rigid design and the flexible electrically conductive element or the cable are of essentially flexible design. In this context, essentially rigid is achieved by virtue of the fact that the respective busbar is embodied as a solid component.

It is also advantageous if the electric motor and the electronic control unit each have at least two, three or more electrical terminals, wherein in each case an electrical terminal of the electric motor is connected to an electrical terminal of the electronic control unit. As a result, the electric motor can be embodied as an AC machine.

It is particularly advantageous if a housing is provided which accommodates the fir electrical terminals, the second electrical terminals, the first and the second busbars, the flexible electrically conductive elements or the cables. This makes it possible to suitably protect both the drive unit and persons from components which conduct high voltage.

Furthermore, it is also advantageous if the housing at least partially accommodates the electronic control unit and/or the electric motor. As a result, simple integration can be implemented.

It is particularly advantageous if the first busbars and the second busbars are embodied as metallic rails, such as copper rails, and/or the flexible electrically conductive elements are embodied as flexible metallic elements or as flexible copper elements and/or the cables are embodied as metal cables or as copper cables. As a result, a simple configuration with necessary flexibility is achieved.

Likewise, it is advantageous if the first busbar and the second busbar are electrically and mechanically connected to the flexible electrically conductive element or to the cable by welding, screwing, clamping, soldering or bonding. As a result, a permanent stable connection can be achieved.

BRIEF DESCRIPTION OF THE DRAWING

In the text which follows the invention is explained in detail on the basis of a exemplary embodiment and with reference to the drawing, in which.

DETAILED DESCRIPTION OF THE INVENTION

Figure 1:
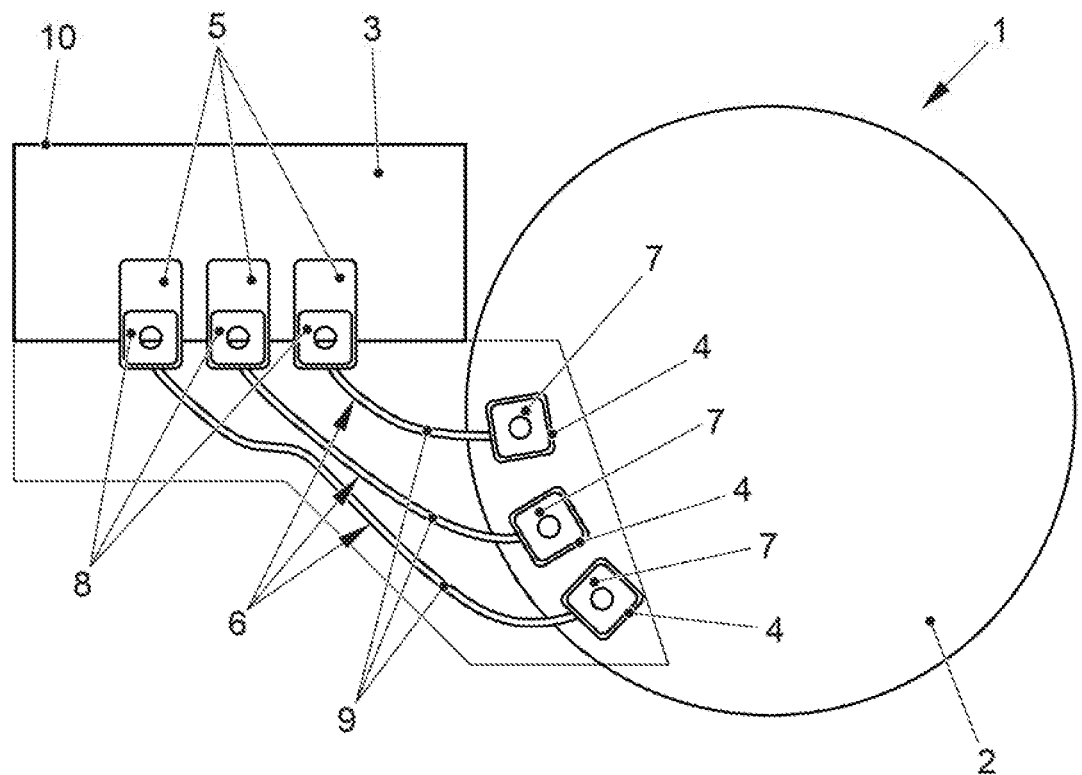
FIG. 1 shows a schematic illustration of an electric drive unit.

FIG. 1 shows a schematic illustration of an electric drive unit 1.

The electric drive unit 1 has an electric motor 2 and an electronic control unit 3, which is embodied, for example, as a pulse width modulated inverter or has such a pulse width modulated inverter.

The electric motor 2 has a number of first electrical terminals 4 and the electronic control unit 3 has a number of second electrical terminals 5, wherein an electrical connection 6 is present between in each case a first electrical terminal 4 and a second electrical terminal 5.

In this context, the first electrical terminals 4 are embodied in such a way that they have a first busbar 7 or are connected thereto or are embodied as a first busbar 7, and the second electrical terminals 5 are embodied in such a way that they have a second busbar 8, are connected to a second busbar 8 or are embodied as such, wherein the first busbar 7 is electrically connected to the second busbar 8 by means of a flexible electrically conductive element 9 or a cable 9.

The respective terminal 4, 5 is correspondingly embodied, as a solid conductive element, as a busbar 7, 8 or connected thereto, and a flexible electrically conductive connection, which can absorb tolerances and movements owing to thermal expansion, for example, is formed between the busbars 7, 8.

According to the inventive concept, the first busbars 7 and the second busbars 8 are of essentially rigid design, for example configured as metallic rails, wherein the flexible electrically conductive element or the cable which is arranged between them and connects them electrically is of essentially flexible design.

As is apparent in FIG. 1, the electric motor 2 and the electronic control unit 3 are embodied as one unit, such that they are connected mechanically to one another and can be installed together.

FIG. 1 also shows that the electric motor 2 and the electronic control unit 3 each have at least two, three or more electrical terminals, wherein in each case an electrical terminal 4 of the electric motor 2 is connected to an electrical terminal 5 of the electronic control unit 3. In the illustrated exemplary embodiment, three first and second terminals 4, 5 are respectively shown.

It is also apparent that a housing 10 is provided which accommodates the first electrical terminals 4, the second electrical terminals 5, the first and the second busbars 7, 8, the flexible electrically conductive elements 9 or the cables 9. The housing 10 at least partially accommodates the electronic control unit 3 and/or the electric motor 2 here, and protects the electrical connections which are typically embodied as high-voltage connections.

According to the inventive concept, it is particularly advantageous if the first busbars 7 and the second busbars 8 are embodied as metallic rails, such as, in particular, as copper rails, and/or that the flexible electrically conductive elements 9 are embodied as flexible metallic elements or as flexible copper elements and/or the cables 9 are embodied as metal cables or as copper cables. It is particularly advantageous here if the first busbar 7 and the second busbar 8 are electrically and mechanically connected to the flexible electrically conductive element 9 or to the cable 9 by welding, screwing, clamping, soldering or bonding.

Figure 2:
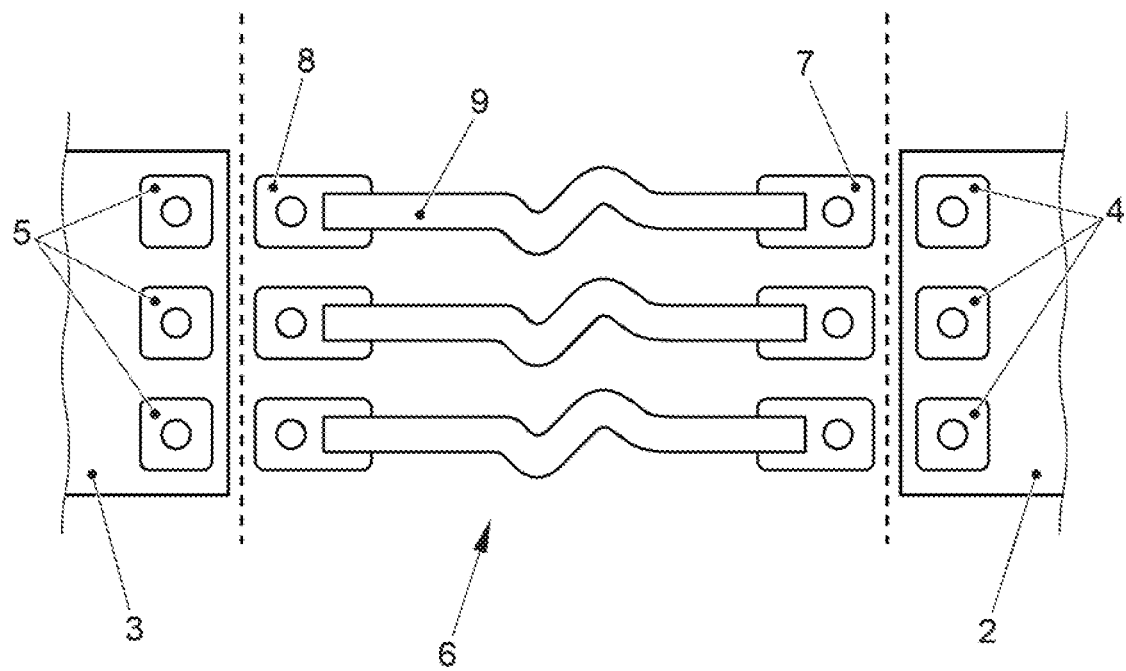
FIG. 2 shows a further schematic partial illustration of an electric drive unit.

FIG. 2 shows once more in a schematic illustration that the electric motor 2 has a number of first electrical terminals 4 and the electronic control unit 3 has a number of second electrical terminals 5, wherein an electrical connection 6 is present between in each case a first electrical terminal 4 and a second electrical terminal 5.

In this context, the first electrical terminals 4 are embodied in such a way that they have a first busbar 7 or are connected thereto or are embodied as a first busbar 7, and the second electrical terminals 5 are embodied in such a way that they are connected to a second busbar 8 or are embodied as such, wherein the first busbar 7 is electrically connected to the second busbar 8 by means of a flexible electrically conductive element 9 or a cable 9.

The busbars 7, 8 are embodied here as short busbars which each do not permit a complete electrical connection between the terminals 4, 5, such that in each case a flexible electrical connection 6, which respectively also spans the distance between the busbars 7, 8, has to be provided between the busbars 7, 8.

What is claimed is:

1. An electric drive unit comprising:
   an electric motor having a plurality of first electrical terminals;
   an electronic control unit having a plurality of second electrical terminals; and
   a plurality of electrical connections, each electrical connection formed between a respective first electrical terminal and a respective second electrical terminal such that a first busbar is connected to or embodied in the first electrical terminal, a second busbar is connected to or embodied in the second electrical terminal, and the first busbar is electrically connected to the second busbar by a flexible electrically conductive element or a cable, wherein each busbar overlaps the flexible electrically conductive element or cable in a lengthwise direction, wherein the flexible electrically conductive element or cable has a greater flexibility than the busbars, wherein the flexible electrically conductive element or cable and the busbars are separate components that are composed of the same material,
   wherein the first electrical terminals are not aligned together in a row, wherein the second electrical terminals are aligned together in a row, wherein the first electrical terminals are rotated with respect to one another, and wherein the flexible electrically conductive elements or cables have different lengths for spanning different distances between first and second electrical terminals.

2. The electric drive unit as claimed in claim 1, wherein the electric motor and the electronic control unit are embodied as one unit.

3. The electric drive unit as claimed in claim 1, wherein the electronic control unit is a pulse width modulated inverter or has a pulse width modulated inverter, and wherein the second electrical terminals constitute poles of the pulse width modulated inverter.

4. The electric drive unit as claimed in claim 1, wherein the first busbars and the second busbars are rigid and the flexible electrically conductive element or the cable are flexible.

5. The electric drive unit as claimed in claim 4, wherein said flexible electrically conductive element or cable is a flexible cable, and each busbar is a solid conductive element.

6. The electric drive unit as claimed in claim 1, wherein the electric motor and the electronic control unit each have at least two electrical terminals, each electrical terminal of the electric motor connected to a respective electrical terminal of the electronic control unit.

7. The electric drive unit as claimed in claim 1, further comprising: a housing.

8. The electric drive unit as claimed in claim 7, wherein the housing at least partially accommodates at least one of the electronic control unit or the electric motor.

9. The electric drive unit as claimed in claim 7, wherein the housing also accommodates, for protection purposes, the first electrical terminals, the second electrical terminals, the first busbars, the second busbars and the flexible electrically conductive elements or cables.

10. The electric drive unit as claimed in claim 1, wherein at least one of the first busbars and the second busbars are embodied as metallic rails or copper rails, the flexible electrically conductive elements are embodied as flexible metallic elements or as flexible copper elements, or the cables are embodied as metal cables or as copper cables.

11. The electric drive unit as claimed in claim 1, wherein the first busbar and the second busbar are electrically and mechanically connected to the flexible electrically conductive element or to the cable by welding, screwing, clamping, soldering or bonding.

12. The electric drive unit as claimed in claim 1, wherein the flexible electrically conductive element or cable has a different width than the busbars.

13. The electric drive unit as claimed in claim 1, wherein the flexible electrically conductive element has a bend in a central portion thereof.

14. The electric drive unit as claimed in claim 1, wherein the flexible electrically conductive element or cable and the busbars are composed of copper.

15. The electric drive unit as claimed in claim 1, wherein the electric drive unit comprises three of said flexible cables and each flexible cable has a different length.

16. The electric drive unit as claimed in claim 1, wherein the flexible cables extend non-parallel with respect to each other, and a separation between the adjacent flexible cables is non-uniform along a length of the flexible cables.

* * * * *